(12) United States Patent
Driscoll

(10) Patent No.: US 12,379,501 B2
(45) Date of Patent: Aug. 5, 2025

(54) SYSTEMS AND METHODS FOR STROBE-LIGHT-BASED NAVIGATION

(71) Applicant: Honeywell International Inc., Charlotte, NC (US)

(72) Inventor: Kevin Raymond Driscoll, Maple Grove, MN (US)

(73) Assignee: Honeywell International Inc., Charlotte, NC (US)

( * ) Notice: Subject to any disclaimer, the term of this patent is extended or adjusted under 35 U.S.C. 154(b) by 952 days.

(21) Appl. No.: 17/513,569

(22) Filed: Oct. 28, 2021

(65) Prior Publication Data

US 2024/0402344 A1    Dec. 5, 2024

(51) Int. Cl.
*G01S 17/93* (2020.01)
*G01S 7/48* (2006.01)
(Continued)

(52) U.S. Cl.
CPC ............ *G01S 17/93* (2013.01); *G01S 7/4808* (2013.01); *G01S 7/484* (2013.01); *G01S 17/89* (2013.01); *G01S 17/933* (2013.01)

(58) Field of Classification Search
CPC ........ G01S 7/4808; G01S 7/484; G01S 17/89; G01S 17/933; G01S 17/93; G01S 17/46;
(Continued)

(56) References Cited

U.S. PATENT DOCUMENTS 3,802,780 A    4/1974 Helm et al.
4,157,544 A    6/1979 Nichols
(Continued)

FOREIGN PATENT DOCUMENTS

EP    2933656 B1    9/2020
WO    2018055513 A2    3/2018
(Continued)

OTHER PUBLICATIONS

Doer et al., "Radar Based Autonomous Precision Takeoff and Landing System for VTOLs in GNSS Denied Environments", 2020 International Conference on Unmanned Aircraft Systems (ICUAS), Sep. 2020, pp. 922 through 931, IEEE, Athens, Greece.
(Continued)

*Primary Examiner* — Daryl C Pope
(74) *Attorney, Agent, or Firm* — Fogg & Powers LLC

(57) ABSTRACT

Systems and methods for strobe-light-based navigation are provided. In one embodiment, a reflected strobe light navigation system for a vehicle comprises: a vehicle navigation system; a reflection processing system coupled to the vehicle navigation system, wherein the reflection processing system is configured to output a navigation solution to the vehicle navigation system; a strobe light generator system configured to transmit a light pulse from the vehicle; and a reflected strobe image capturing system coupled to the reflection processing system, wherein the reflected strobe image capturing system is configured to capture images of reflected strobe light pulses received from a retro-reflector array, wherein the reflected strobe light pulses comprise reflections of the light pulse reflected by the retro-reflector array; wherein the reflection processing system evaluates one or more image frames each comprising a pattern of reflected light pulse images produced from the reflected strobe light pulses to calculate the navigation solution.

20 Claims, 15 Drawing Sheets

(51) Int. Cl.
*G01S 7/484* (2006.01)
*G01S 17/89* (2020.01)
*G01S 17/933* (2020.01)

(58) Field of Classification Search
CPC ......... G01S 17/58; G01S 17/74; H01Q 15/23; G08G 5/50; G08G 5/55; G08G 5/59; G08G 5/54
See application file for complete search history.

(56) References Cited

U.S. PATENT DOCUMENTS

| | | | |
|---|---|---|---|
| 2006/0232443 | A1 | 10/2006 | Brown |
| 2021/0255616 | A1 | 8/2021 | Surace |
| 2022/0026177 | A1* | 1/2022 | Cederwall ............... G01S 13/75 |
| 2022/0073101 | A1* | 3/2022 | Wang ................. B62D 15/0285 |

FOREIGN PATENT DOCUMENTS

| | | |
|---|---|---|
| WO | 2018055513 A3 | 3/2018 |
| WO | 2020117692 A1 | 6/2020 |
| WO | 2020122777 A1 | 6/2020 |

OTHER PUBLICATIONS

Federal Aviation Administration, "Vertiport Design", Federal Aviation Administration, May 31, 1991, pp. 1 through 39, Advisory Circular, U.S. Department of Transportation.

Honeywell, "Honeywell Paves The Way To Bring Autonomous Landing Capabilities To Urban Air Mobility", Jun. 23, 2020, pp. 1 through 3.

Sampson, "Honeywell flight testing autonomous landing sensors for urban air mobility", Jun. 24, 2020, pp. 1 through 3, Aerospace Testing International.

Verticalmag, "Honeywell explores automated landing capabilities for urban air mobility", Vertical, Jun. 25, 2020, pp. 1 through 5, https://verticalmag.com/news/honeywell-explores-automated-landings-uam/.

European Patent Office, "Extended European Search Report", from U.S. Appl. No. 17/513,569, filed Mar. 3, 2023, from Foreign Counterpart to U.S. Appl. No. 17/513,569, filed Mar. 3, 2023, pp. 1 through 8, Published: EP.

* cited by examiner

SYSTEMS AND METHODS FOR STROBE-LIGHT-BASED NAVIGATION

BACKGROUND

Urban air mobility (UAM) refers to urban transportation systems that move people by air. Such transportation systems developed in response to traffic congestion, as well as other factors, and will be implemented based on emerging air vehicle designs including personal air vehicles, and cargo and delivery drones. A urban transportation systems may comprise either autonomous or semi-autonomous air vehicles. The takeoff and landing facilities used by UAM vehicles, often referred to as vertiports, can typically be expected to include multiple closely spaced landing pads with multiple UAM vehicles performing concurrent takeoff and landing operations. As such, it is important for a UAM vehicle approaching a vertiport for landing to be able to clearly identify which one of the many landing pads they are clear to use and be able to navigate safely to that landing pad. Radar-based solutions have been proposed that utilize landing pads equipped with corner cube radar retroreflectors. However, UAM vehicles are intended to be small, lightweight, and relatively inexpensive to operate and maintain s compared to traditional aircraft. To equip such a vehicle with radar equipment having the necessary sensitivity to support aircraft navigation can be expensive, complex and heavy, have substantial power requirements, and require regular preventative maintenance.

For the reasons stated above and for other reasons stated below which will become apparent to those skilled in the art upon reading and understanding the specification, there is a need in the art for systems and methods for strobe-light-based navigation.

SUMMARY

The Embodiments of the present disclosure provide systems and methods for strobe-light-based navigation and will be understood by reading and studying the following specification.

In one embodiment, a reflected strobe light navigation system for a vehicle comprises: a vehicle navigation system; a reflection processing system coupled to the vehicle navigation system, wherein the reflection processing system is configured to output a navigation solution to the vehicle navigation system; a strobe light generator system configured to transmit a light pulse from the vehicle; and a reflected strobe image capturing system coupled to the reflection processing system, wherein the reflected strobe image capturing system is configured to capture images of reflected strobe light pulses received from a retro-reflector array, wherein the reflected strobe light pulses comprise reflections of the light pulse reflected by the retro-reflector array; wherein the reflection processing system evaluates one or more image frames each comprising a pattern of reflected light pulse images produced from the reflected strobe light pulses to calculate the navigation solution.

DRAWINGS

Embodiments of the present disclosure can be more easily understood and further advantages and uses thereof more readily apparent, when considered in view of the description of the preferred embodiments and the following figures in which.

In accordance with common practice, the various described features are not drawn to scale but are drawn to emphasize features relevant to the present disclosure. Reference characters denote like elements throughout figures and text.

DETAILED DESCRIPTION

Figure 1:
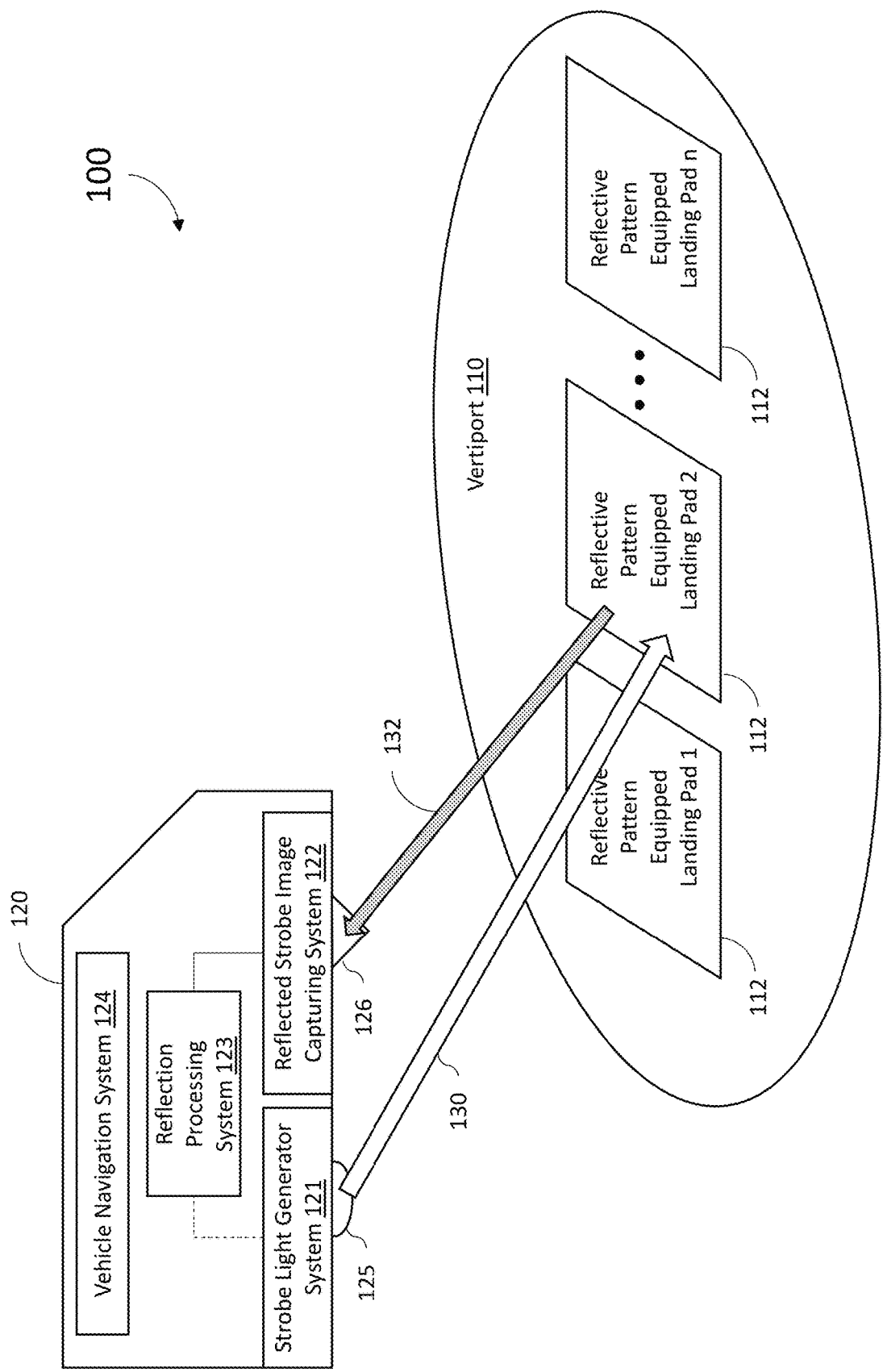
FIG. 1 is a diagram illustrating a reflected strobe light vehicle approach and landing system of one example embodiment.

In the following detailed description, reference is made to the accompanying drawings that form a part hereof, and in which is shown by way of specific illustrative embodiments in which the embodiments may be practiced. These embodiments are described in sufficient detail to enable those skilled in the art to practice the embodiments, and it is to be understood that other embodiments may be utilized and that logical, mechanical and electrical changes may be made without departing from the scope of the present disclosure. The following detailed description is, therefore, not to be taken in a limiting sense.

One or more embodiments of the present disclosure utilize a combination of vehicle mounted strobe lights and cameras, and landing pads equipped with optical light passive retroreflectors.

It should be understood that while the embodiments discussed herein are beneficial when applied to a UAM vehicle, the vehicles with which these embodiments may be used are not limited to being UAM vehicles. Any of the embodiments disclosed herein may be practice in conjunction with other vehicles as well, such as, but not limited to, helicopters or other vehicles that could benefit from inexpensive precision navigation and/or landing capabilities.

Patterns in the geometric arrangement, color and/or other characteristics of the landing pad retroreflectors permit the vehicle to utilize reflected strobe light pulses to positively identify a specific landing pad from the many landing pads that may present at a vertiport. Further the observed distortion, that is, the pattern mapping onto an image plane of the geometric arrangement of the retroreflectors as viewed by the vehicle cameras/sensors, may be utilized to determine a relative position, attitude and velocity of the vehicle. For example, based on an observed geometric pattern of reflected strobe light pulses returned from a specific landing pad as compared to a baseline pattern associated with that specific landing pad, a processor onboard the aircraft can determine factors such as the line-of-sight (LoS) angle to the landing pad. The apparent size of the pattern of reflected strobe light pulses may be utilized to calculate a distance from the aircraft to the landing pad. The rate of change in the apparent size of the pattern of reflected strobe light pulses may be utilized to calculate the speed of the vehicle's approach to landing site. In some embodiments, the standard collision avoidance strobe lights (or other strobe lights)

present on the aircraft may be utilized to generate the strobe light pulses that are received at the landing pad retroreflectors and reflected back to the aircraft. That is, regulatory agency mandated clearance strobe lights (e.g, a red light on the port side, a green light on the starboard side, a white light at the back, and a bright white strobe light underneath) become dual purpose strobe lights, also serving the landing/navigation systems disclosed herein thus making such embodiments potentially less expensive to implement.

Alternatively, strobe lights specifically designated to facilitate strobe-pulse-based vehicle landing and/or navigation functions may be utilized. As compared to tradition forms of landing aids such as radar, implementations of the embodiments disclosed herein may smaller in costs, lighter in weight, consume less power, and entail less maintenance, which are advantageous for delivering small lightweight vehicles such as for use in UAM environments.

FIG. 1 is a diagram illustrating a reflected strobe light navigation system 100 example embodiment, more particularly, an vehicle approach and landing system 100. As illustrated in FIG. 1, system 100 includes a vertiport 110 having one or more landing pads 112 that facilitate vertical and/or short take-off and landing (VTOL/STOL) operations. As the term is used herein, a "vertiport" comprises any type of facility that can support VTOL and/or STOL operations and as such may constitute part of a traditional airport, or may be a separate facility apart from a traditional airport. In some embodiments, a traditional heliport may operate as a vertiport. In the embodiment of FIG. 1, the vertiport 110 supports takeoff and landing operations for one or more vehicles 120. In some embodiments, the vehicle 120 may comprise a UAM vehicle, but is not necessarily limited to a UAM vehicle.

As illustrated in FIG. 1, vehicle 120 comprises a strobe light generator system 121 that includes one or more strobe light emitters 125. In some embodiments, a strobe light emitter 125 comprises one or more light emitting diode (LED) strobe lights. In some embodiments, the strobe light emitters 125 may generate a strobe pulse of light within the visible spectrum. In other embodiments, the strobe light emitters 125 may generate a strobe pulse of light within the infrared spectrum, or a combination of light within the visible and IR spectrums. The strobe light generator system 121 may comprise a controller programed to control operation of the strobe light emitters 125 in the manner described with respect to any of the embodiments disclosed herein. In some embodiments, a strobe light emitter 125 may further function as one of the anti-collisions lights or beacons standard on aircraft. In other embodiments, a strobe light emitter 125 may be devices independent of any anti-collisions lights or beacons.

Vehicle 120 further includes a reflected strobe image capturing system 122 coupled to a reflection processing system 123, and a vehicle navigation system 124. The reflected strobe image capturing system 122 includes an image capturing device 126 which may be implemented using a visual and/or infra-red spectrum camera, for example.

In operation, the strobe light emitter 125 transmits a light pulse 130 to the landing pad 112. The light pulse 130 is received by a retroreflector array 146 (shown in FIGS. 1A and 1B) producing a return comprising a pattern of reflected strobe light pulses 132 that are received by the image capturing device 126. The reflected strobe image capturing system 122 outputs one or more image frames of the pattern of reflected strobe light pulses 132, which are processed and evaluated by the reflection processing system 123 to determine factors such as line-of-sight (LoS) angle to the landing pad 112, distance to the landing pad 112, and other vehicle navigation data as discussed in greater detail below. The vehicle navigation system 124 may then input this navigation data to maneuver the vehicle 120 to the landing pad 112.

Figure 1B:
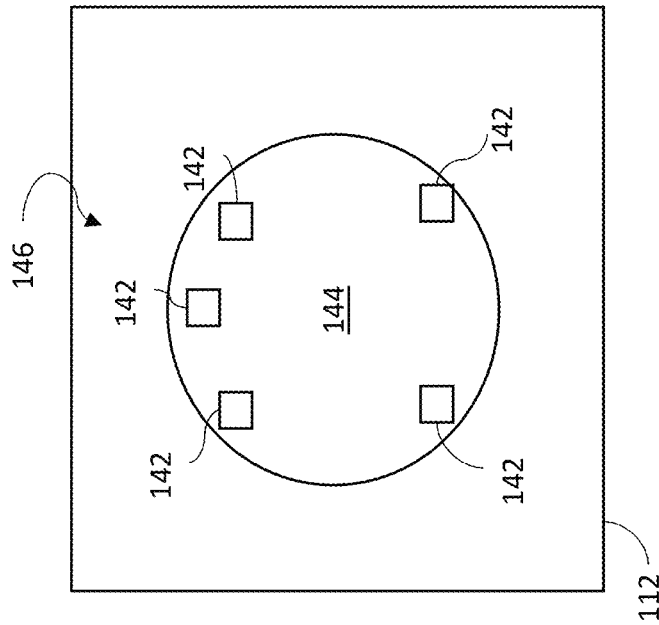
FIGS. 1A and 1B illustrate example embodiments of landing pad configurations.
Figure 1A:
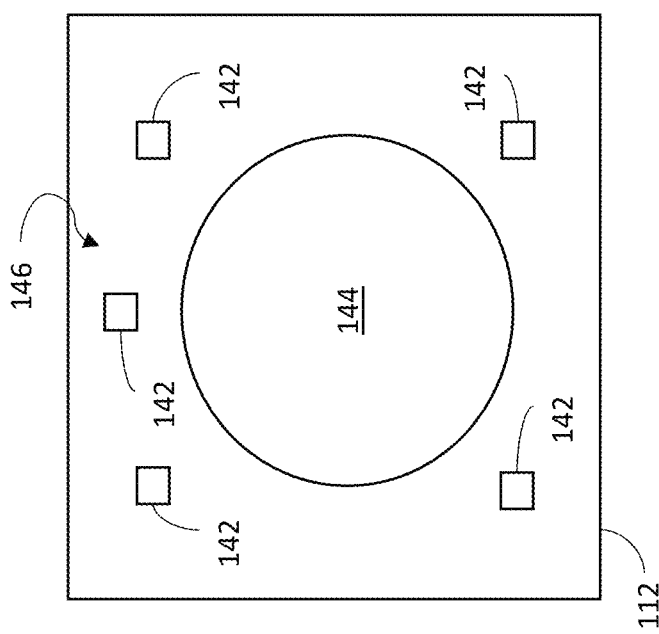

FIGS. 1A and 1B illustrate example landing pad 112 configurations. In FIG. 1A, the landing pad 112 comprises a retroreflector array 146 comprising a plurality of retroreflectors 142. The retroreflectors 142 may comprise retroreflective structures (such as corner-cube retroreflectors (CCRs) trihedral prisms, or spheres) configured to reflect an incident light pulse 130 as a reflected strobe light pulses 132 back in the direct from which the incident light pulse 130 originated. In some embodiments, the retroreflectors 142 may be secured to pylons, rods, or other structures that position the retroreflectors 142 above a surface of the landing pad 112 so that they remain visible, for example, when a layer of snow is present. In some implementations, down-wash from frequent vehicle landings may displace accumulated dust and snow to keep the retroreflectors 142 clear.

In the example of FIG. 1, the incident light pulse 130 transmitted from the vehicle 120 would be returned as the reflected strobe light pulses 132 back at the vehicle 120. Each of the retroreflectors 142 of the retroreflector array 146 would produce its own reflected strobe light pulse that is offset in position and angle from the other retroreflectors 142 of the retroreflector array 146, with the composite of these reflected strobe light pulse forming the reflected strobe light pulses 132. The pattern of the reflected strobe light pulses 132 as they appear in the image frames may be used to guide the vehicle to the target landing area 144 of the landing pad 112. In some embodiments, such as shown in FIG. 1A, the retroreflectors 142 of the retroreflector array 146 may be positioned outside of the target landing area 144, such as around a perimeter of the target landing area 144. In other embodiments, such as shown in FIG. 1B, the retroreflectors 142 of the retroreflector array 146 may be positioned inside of the target landing area 144.

It would be appreciated by those skilled in the art studying this disclosure that the closer the retroreflectors 142 are to each other, the more easily the image capturing device 126 can keep all of the retroreflectors 142 within its field of view as it get closer to, and lands within, the target landing area 144. At the same time, the closer positioning means that the pattern of reflected strobe light pulses 132 as observed from the vehicle 120 will be smaller with the reflected strobe light pulses less offset in position and angle from each other. In contrast, the farther the retroreflectors 142 are from each other, the more the pattern of reflected strobe light pulses 132 as observed from the vehicle 120 will be larger with the reflected strobe light pulses more offset in position and angle from each other. It should be noted that with the larger pattern of reflected strobe light pulses 132, the more accurately the reflection processing system 123 can utilize the image frames to produce navigation data. However, that the farther the retroreflectors 142 are from each other, the harder it becomes for the image capturing device 126 to keep all of the retroreflectors 142 within its field of view as it get closer to, and lands within, the target landing area 144. Accordingly, in some embodiments, the reflected strobe image capturing system 122 may comprise a plurality of image capturing devices 126. A plurality of image frames simultaneously captured by the plurality of image capturing devices 126 are combined by the reflection processing system 123 using a stitching algorithm (shown at 222 in FIG. 2) to provide a composite image frame that includes reflected pulses from all of the retroreflectors 142 of the retroreflector array 146. Additionally, in some embodiments where reflected strobe image capturing system 122 comprises a plurality of image capturing devices 126, the image capturing devices 126 may provide redundancy for each other so that if one of the image capturing devices 126 should fail, one or more of the other image capturing devices 126 may have a field of view overlapping with that of the failed device 126 so that observation of the full retroreflector array 146 is maintained.

Figure 2:
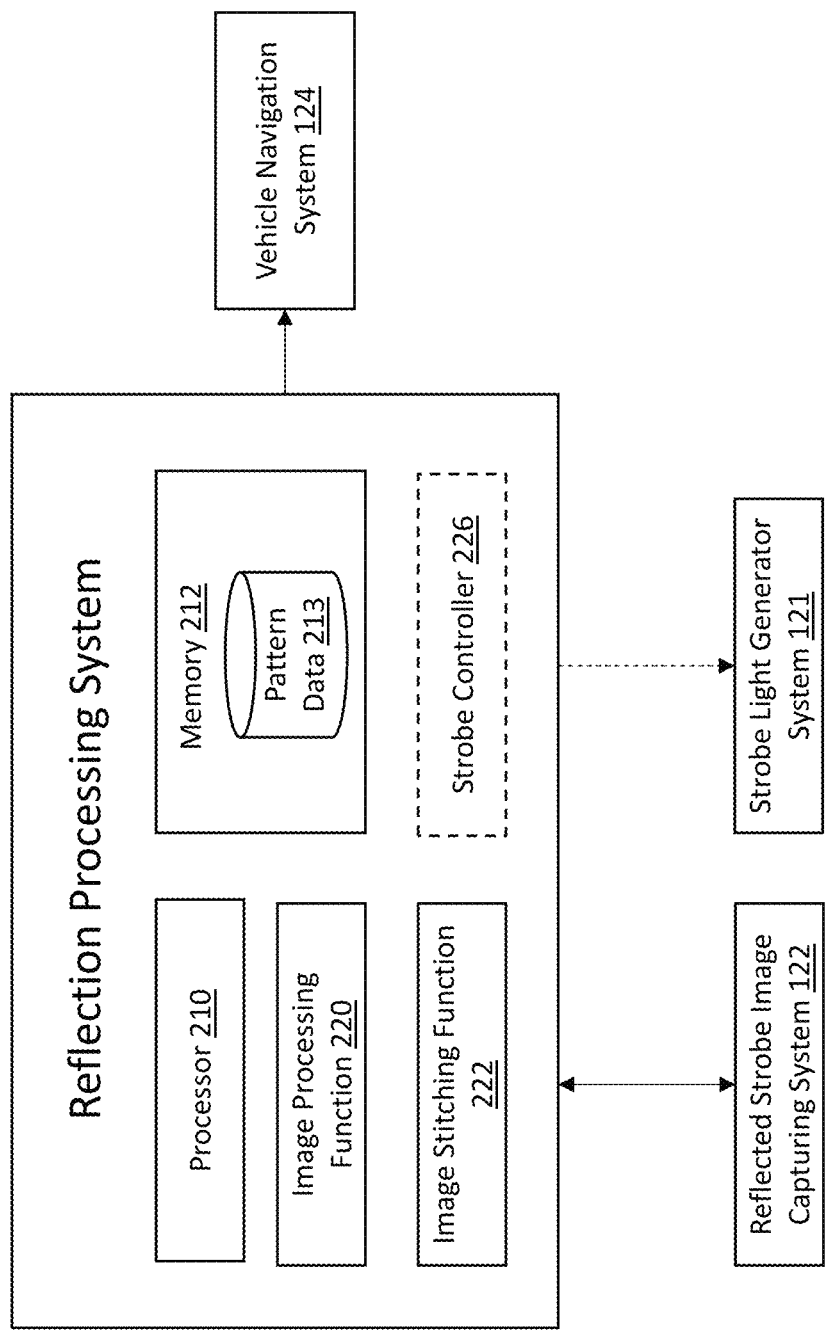
FIG. 2 is a diagram illustrating an example embodiment of a reflection processing system.

FIG. 2 is a diagram illustrating a reflection processing system 123 such as described above with respect to FIG. 1. In some embodiments, the reflection processing system 123 comprises a controller (such as a processor 210 that is coupled to a memory 212) programed to execute code to implement the functions of reflection processing system 123 described herein. In one embodiment, the image processing function 220 is one such application executed by the processor 210. In operation, the image processing function 220 inputs one or more image frames that include images of the pattern of reflected strobe light pulses 132. Depending on the distance and relative position and attitude of the vehicle 120 with respect to the landing pad 112 and retroreflector array 146, the image of the pattern of reflected strobe light pulses 132 appearing in the image frame will be a pattern mapped version of the actual pattern of retroreflectors 142 arranged at the landing pad 112. The image processing function 220 may thus compare the pattern appearing in the image frame against a baseline image of the actual pattern of retroreflectors 142 at that landing pad 112 to calculate navigation data such as, but not limited to, the line-of-sight (LoS) angle between the vehicle 120 and the landing pad 112, the distance between the vehicle 120 and the landing pad 112, the relative attitude of the vehicle 120 with respect to a plane of the landing pad 112, and/or the vehicle speed of approach to landing pad 112.

In some embodiments, different landing pads 112 may comprise different geometric arrangements of the retroreflectors 142 so that specific landing pads 112 of interest may be discerned from other nearby landing pads 112 based on the pattern of reflected strobe light pulses 132 appearing in captured images. For example, the image of the pattern of reflected strobe light pulses 132 may be compared against the baseline image to match the geometric layout of the retroreflectors 142 to confirm that the returned reflected strobe light pulses 132 are indeed coming from the landing pad 112 of interest. In some embodiments, the retroreflectors 142 may filter or otherwise alter the incident light pulse 130 to impart a color on the returned reflected strobe light pulses 132. In this way, a specific landing pad 112 of interest may be further differentiated from other landing pads 112 based on the color pattern. For example, a retroreflector array 146 comprising five retroreflectors 142 each returning reflections of a different color (for example, white, blue, yellow, red and green) can encode the pattern of the reflected strobe light pulses 132 with 4^5, or 1024 different color combinations. The selected colors may fall within the visual or IR light spectrums. This color-based differentiation may be combined with geometric pattern variations to produce additional pattern combinations. For example, if four of the five retroreflectors 142 are located at the corners of a square, but the fifth retroreflector 142 were allowed to be not exactly in the middle but closer to a retroreflector 142 at one corner or the other, there would be three geometry variations. If this fifth reflector retroreflector 142 were positioned outside the square such that it wasn't exactly in line between two corner retroreflectors 142, there would be six geometry variations.

If the retroreflector array 146 comprises a total of six retroreflector 142 instead of five and using these six geometry variations, the two non-corner retroreflector 142 could be arranged in 2^6−1=63 ways. If we combined the color and geometry variations, there would be 63×1024=64,512 possibilities. It should be understood that these examples are not intended as limiting as there can be color palettes with more or less that 5 colors, and there are other ways of creating geometry variations. Further, geometries other than a square could be used, but the square may be particularly useful, given that landing zone areas often are squares.

The observed color and geometric pattern of the returned reflected strobe light pulses 132, may thus be compared by the reflection processing system 123 against the baseline pattern to positively identify a specific landing pad 112. In some embodiments, the reflection processing system 123 may store in its memory 212 a retro-reflector array pattern database 213 comprising a catalog of landing pads 112 in a service area of the vehicle 120, and the baseline patterns (whether geometric, color coded, or both) associated with those landing pads 112. One a landing pad 112 of interest is designated, the reflection processing system 123 may correlate an identifier for that landing pad 112 against the retro-reflector array pattern database 213 to fine the baseline pattern for that designated landing pad 112. In other embodiments, the reflection processing system 123 may download and store into memory 212 the baseline pattern at the time of departure, or upon receiving a clearance to land at a designated arrival landing pad 112.

It should be understood that depending on the number of vehicles 120 operating in a particular geographic area, only a small subset of the total number of possible variations may be utilized. For example, regional authorities may establish a criterial that no retroreflector array 146 pattern can repeat within a predetermined distance (for example, a distance equal to the maximum flight distance of vehicle 120 times two). Another subsetting criteria may be established to account for the possibility of missing or inadvertently moved retroreflectors 142. In one embodiment, such a criteria may be based on the "Hamming distance" concept where each retroreflector array 146 pattern within a geographic area would have at least N differences, where N is chosen for the degree of fault tolerance desired.

FIGS. 3A-3J are diagrams illustrating the processing of image frames comprising a pattern of reflected strobe light pulses 132 to obtain navigation data. In each of these figures, a simplified image frame of a navigation pattern structure is depicted generally at 301 based on the relative position of vehicle 300 to a landing pad 112 having an retroreflector array 146 as shown generally at 302. The vehicle 300 as depicted in FIGS. 3A-3J is shown for example purposes only as a simplified helicopter-like UAM that has 2 side-by-side rotors. As mentioned above, it should be understood that neither the vehicle 300, nor any other vehicle discussed herein, is limited to being a UAM. Any of the embodiments disclosed herein may be practice in conjunction with other vehicles as well, such as, but not limited to, helicopters or other vehicles that could benefit from inexpensive precision navigation and/or landing capabilities. Otherwise, vehicle 300 comprises each of the elements and features of vehicle 120 as discussed throughout this disclosure.

The retroreflector array 146 installed at the landing pad 112 in this example embodiment comprises an irregular polygon shape. A three cornered polygon may permit calculation of the LOS angle and distance to the landing pad, but if an equilateral triangle, could introduce ambiguities as to its geographic orientation. Polygon irregularity allows the reflection processing system 123 to determine the heading of vehicle 120 with respect to the landing site's orientation. The position and pattern mapping of the polygon's image as observed by the image capturing device 126 allows the reflection processing system 123 to determine the LOS angle to the landing pad 112. For example, a square shaped retroreflector array 146 at the landing site may appear trapezoidal in image frame 301 and the angle of the non-parallel sides can be used to help determine the LOS angle. The apparent size of the polygon and LOS angle is also a function of the distance from vehicle 300 to landing pad 112 and therefore may be used to solve fore distance. The change in this apparent size is an indication of the rate of change in distance and thus used by reflection processing system 123 to calculate the speed at which vehicle 300 is approaching, or moving away from, the landing pad 112.

For the purpose of these illustrative embodiments, the retroreflector array 146 at a landing pad 112 comprises five retroreflectors 142 (only three of which are visible in the Figures). Four are arranged to define the corners of a square and the fifth is utilized to define the particular geographic orientation of the retroreflector array 146. That is, a non-corner retroreflector 142 (having any form of asymmetry with respect to the other retroreflectors 142 of the retroreflector array 146) may function as a geo-alignment retroreflector such that a line between the geometric center of the retroreflector array 146 (shown at 310) and the geo-alignment retroreflector 142 would point in the direction of a predefined heading (such as due north, for example). In some embodiments, baseline pattern information about the retroreflector array 146 obtained by the reflection processing system 123 may include data regarding the orientation heading indicated by the geo-alignment retroreflector 142 point (such as its angular offset with respect to due north). In some embodiments, the retroreflector array 146 may comprise multiple such geo-alignment retroreflectors 142 for purposes of redundancy.

The pattern of reflected strobe light pulses 132 will appear in the captured image frame 301 as shown generally at 315 with each retroreflector 142 contributing a reflected light pulse image 320. When the vehicle is positioned directly over the retroreflector array 146, the pattern 315 of the reflected light pulse images 320 appearing in the image frame 301 will appear undistorted, conforming to the baseline pattern for that landing pad 112. For example, in FIG. 3A, the vehicle 300 is positioned directly over the landing pad 112 and retroreflector array 146, as shown at 302. The corresponding the image frame 301 produced by the reflection processing system 123 with the vehicle 300 in this position comprises the pattern of reflected light pulse images 320 that appear as a square, with one reflected light pulse image 320 from the geo-alignment retroreflector 142 (shown at 321) indicating the orientation of the retroreflector array 146. This may be referred to as the geo-alignment pulse image 321. The retroreflector array 146 center point 310 (marking the center point of landing pad 112) is in alignment with an imaginary fiducial mark 312 at the captured image frame's center of view. Because the image shape conforms to the baseline pattern for that landing pad 112, the line-of-sight (LOS) 303 from center point 312 of the image frame 301 to the center point 310 of the retroreflector array 146 indicates that the aircraft is directly over the landing pad 112, pointed in the direction of the heading defined by the geo-alignment pulse image 321, and has zero vehicle roll and zero vehicle pitch angles.

Figure 3A:
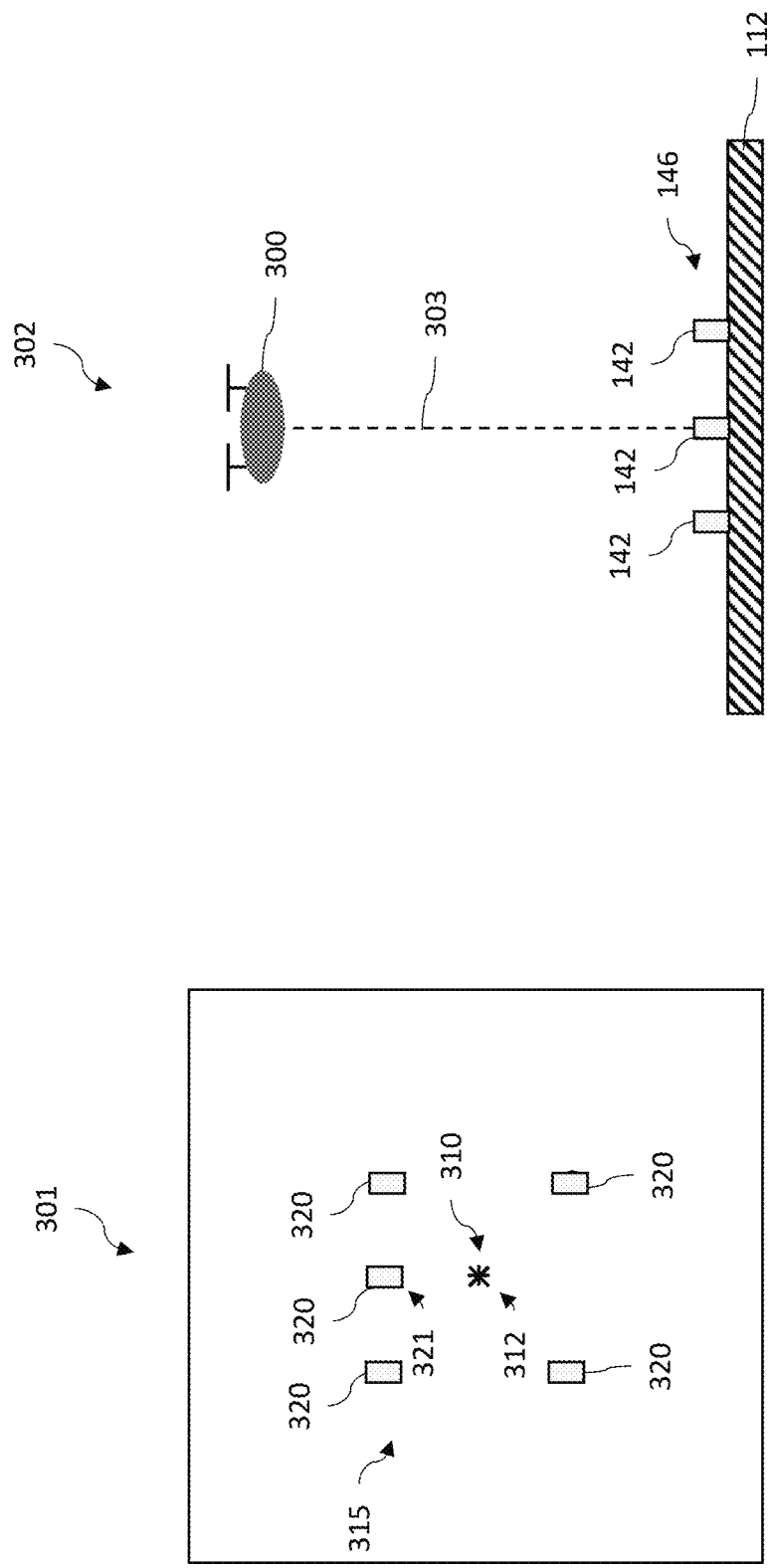
FIG. 3A-3J are diagrams illustrating example embodiments of processing by a reflection processing system of image frames comprising pattern of reflected strobe light pulses from a landing pad.
Figure 3B:
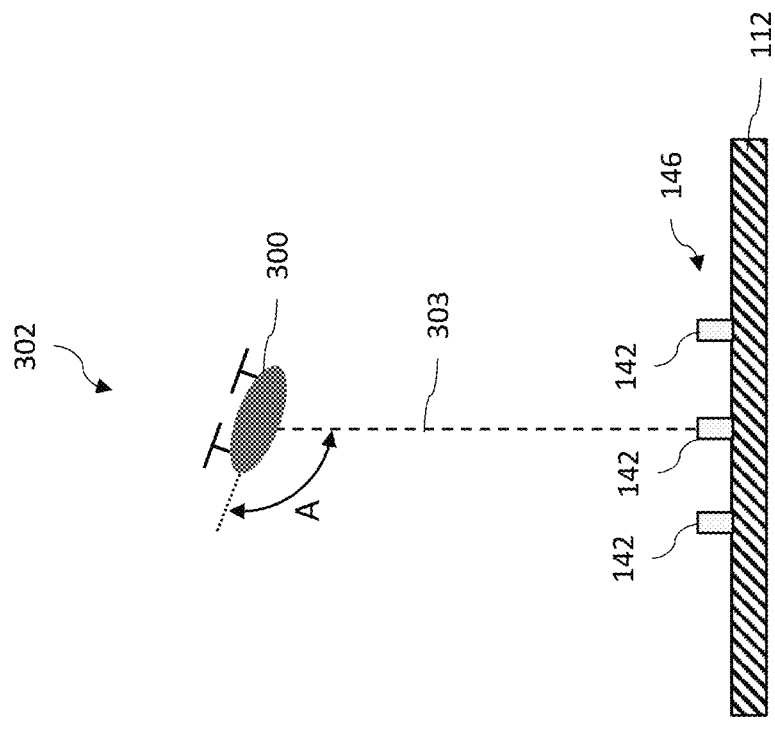
Figure 3B:
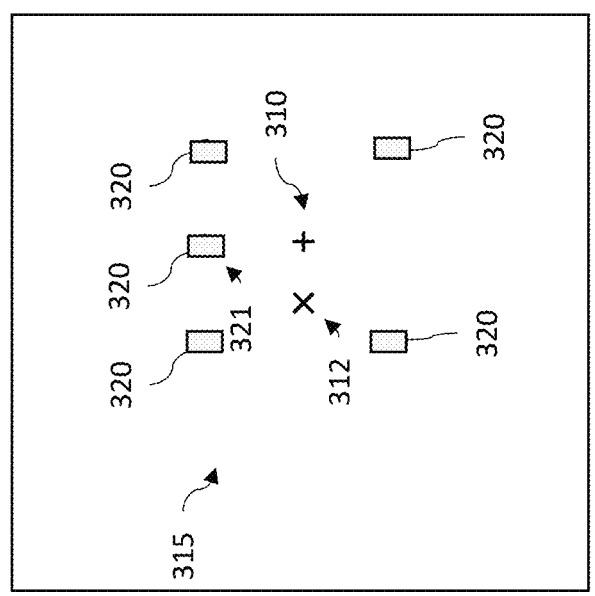

As illustrated in FIG. 3B, when the vehicle 300 is not directly above the landing pad 112, the pattern of the retroreflector array 146 appearing in image frame 301 becomes altered. The reflected light pulse images 320 at the corners are still identifiable and the center point 310 of the retroreflector array 146 can still be found (for example, by drawing lines between the diagonally opposite corners and where the two line cross is the center of the square). In this illustration, the vehicle 300 is in the same position as in FIG. 3A, except that it has rolled to the right, producing offsets in the position of the reflected light pulse images 320 appearing in the image frame 301. The reflection processing system 123 calculates the roll angle (shown as angle A) with respect to the line-of-sight (LOS) to the center point 310 of the of the retroreflector array 146 pattern from the image y-axis distance from the fiducial mark 312 to the center point 310 of the of the retroreflector array 146 pattern. Because the LOS angle is vertical in this scenario (which can be determined by the square image having all 4 sides equal and all 4 corners 90°), angle A can be used to determine the roll angle A with respect to the ground.

Figure 3C:
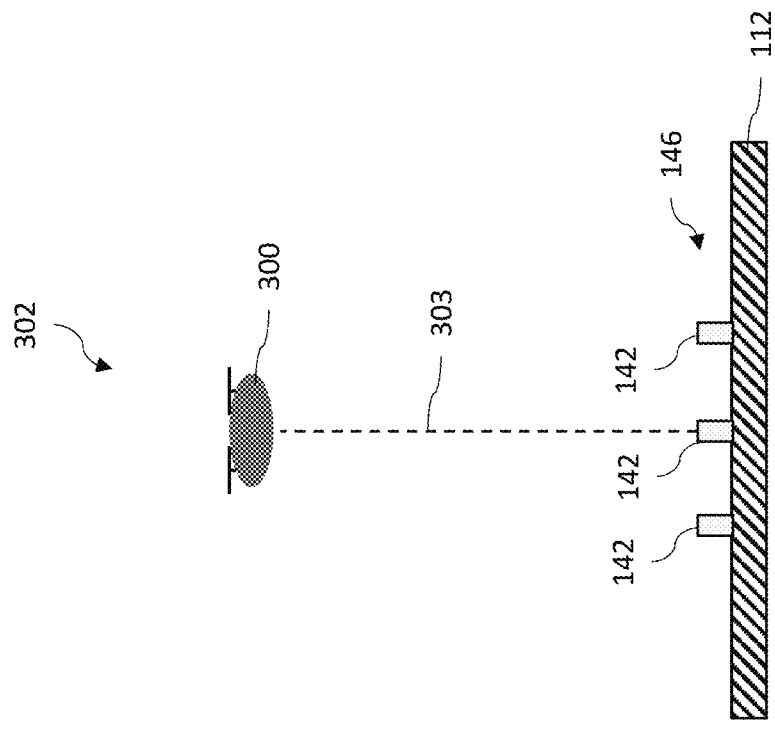
Figure 3C:
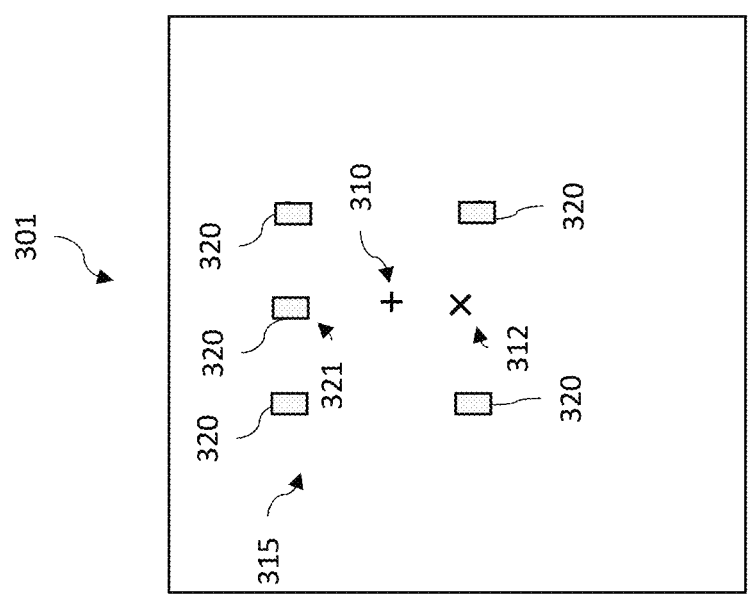

FIG. 3C illustrates another scenario where the vehicle 300 is positioned the same as in FIG. 3A, except that the vehicle 300 has pitched nose-downward. That pitch angle can be calculated from the image frame 301 based on the x-axis distance from the fiducial mark 312 to the center point 310 of the retroreflector array 146 pattern, similar to how the roll angle is determined from y-axis distance in FIG. 3B.

Figure 3D:
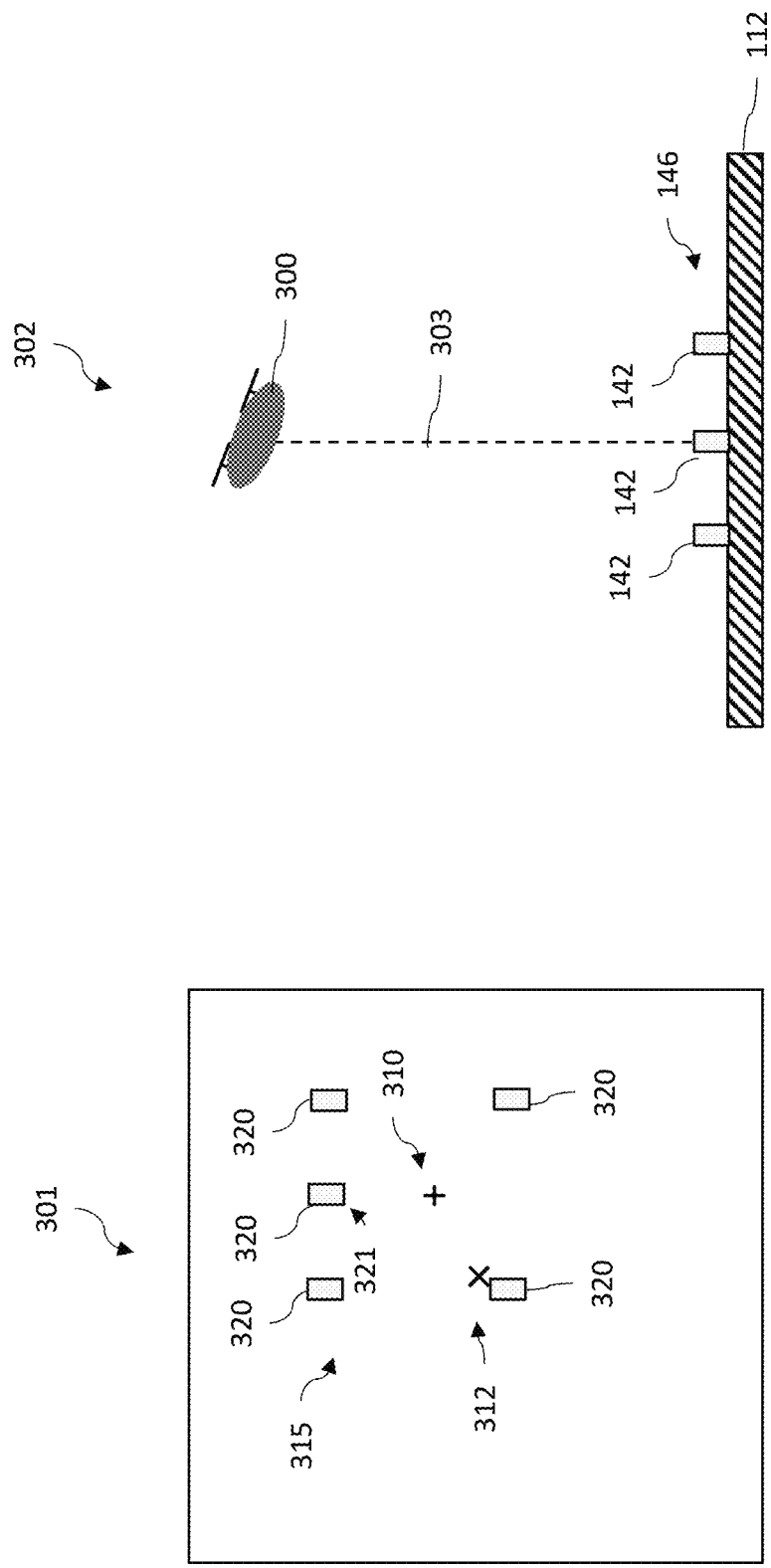

FIG. 3D illustrates a scenario where the vehicle 300 is positioned the same as in FIG. 3A, except that it has non-zero roll and pitch angles, such as would be produced by the combination of FIGS. 3B and 3C. The pitch and roll angles can each be calculated by the reflection processing system 123 independently based on the image frame 301's x-axis and y-axis offsets from the fiducial mark 312 as before.

Figure 3E:
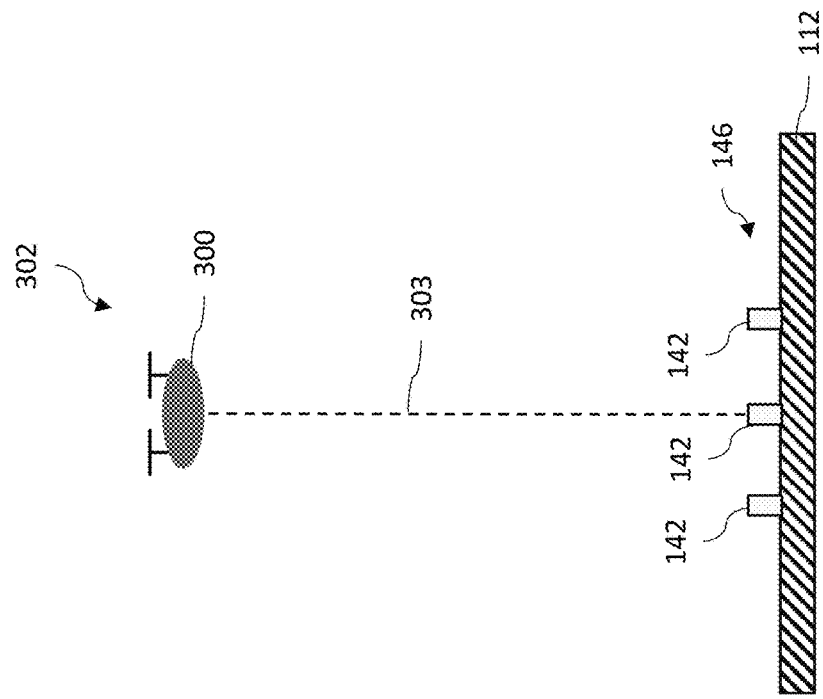
Figure 3E:
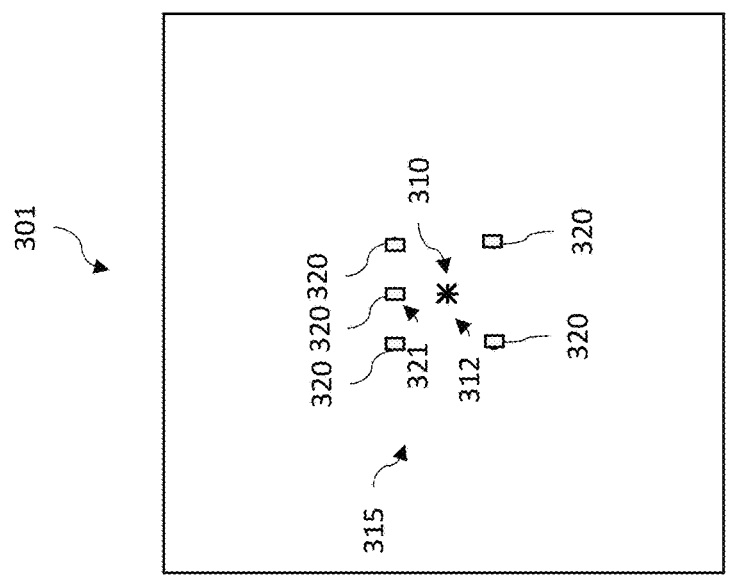
Figure 3F:
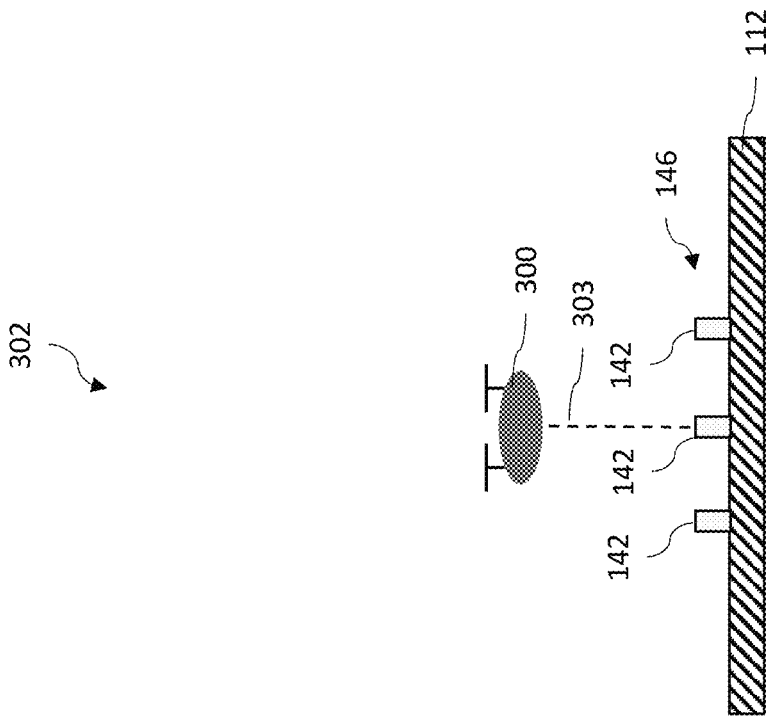
Figure 3F:
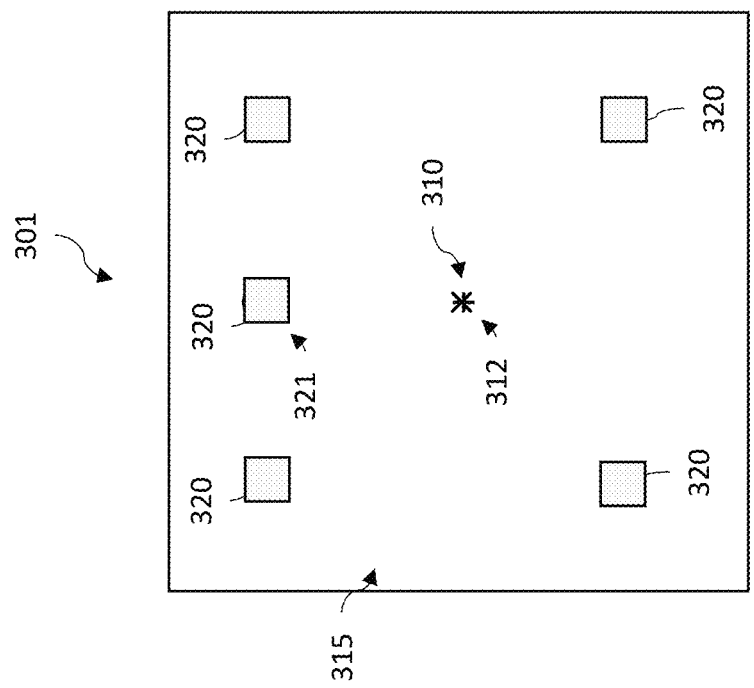

FIGS. 3E and 3F illustrate determining distance of the vehicle 300 from the landing pad 112. In FIG. 3E, the position of vehicle 300 is the same as in FIG. 3A, except that the vehicle is farther away from the landing site. In FIG. 3F, the position of vehicle 300 is the same as in FIG. 3A, except that the vehicle is closer to the landing site. Here, the distance (e.g., the length of the LOS line between the vehicle and landing pad) can be calculated from the area within the polygon appearing in the image frame 301. For example, the baseline pattern data associate with that landing pad 112 may include information correlating a baseline area of the baseline pattern when observed at a normalized position to LOS distance. The reflection processing system 123 can then correlate the area within the polygon pattern 315 appearing in the image frame 301 against that baseline area and as a function of the difference determine the LOS distance from the vehicle 300 to the landing pad 112.

Figure 3G:
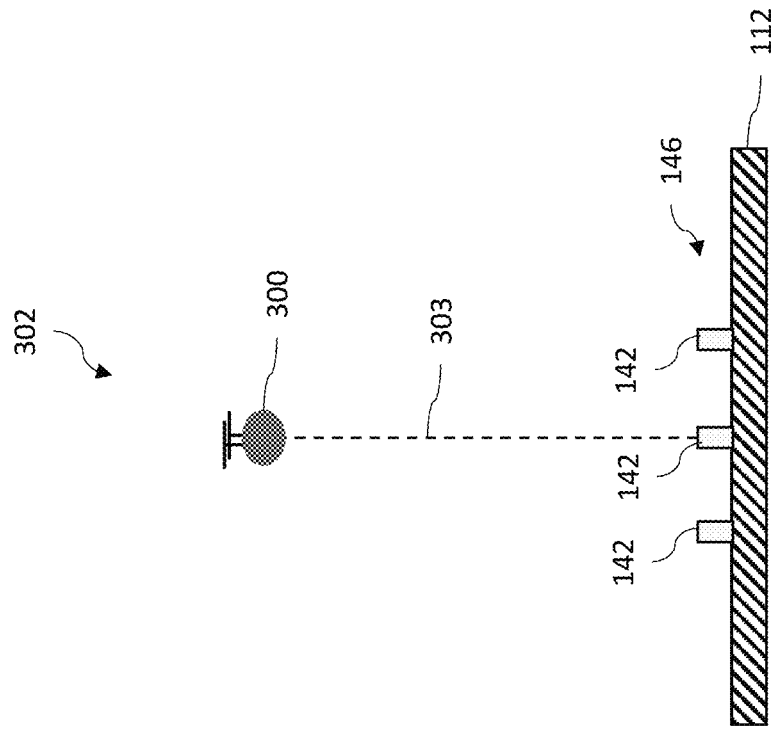
Figure 3G:
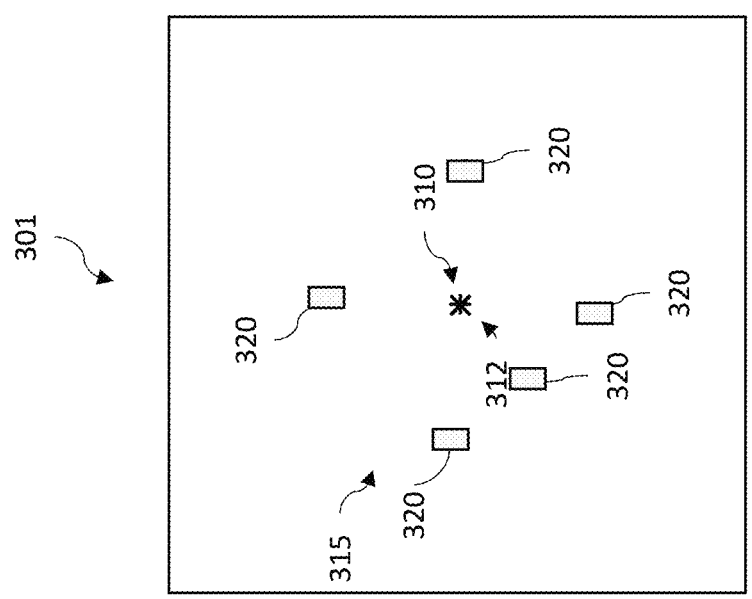

FIG. 3G illustrates a scenario where the vehicle 300 is directly overhead of the landing pad 112 so that the pattern 315 of the reflected light pulse images 320 is not altered, but the pattern mapping appears rotated. Here, since the upward direction of the image frame 301 defines the vehicle's direction of travel, the angular offset of the image from the angle of rotation of the geo-alignment pulse image 321 may be used by the reflection processing system 123 to calculate the heading of the vehicle 300's direction of travel. For example, if the position of the geo-alignment pulse image 321 with respect to the center point 310 is known to define north, then the rotation illustrated in FIG. 3G indicates that the vehicle is traveling south-east.

Figure 3H:
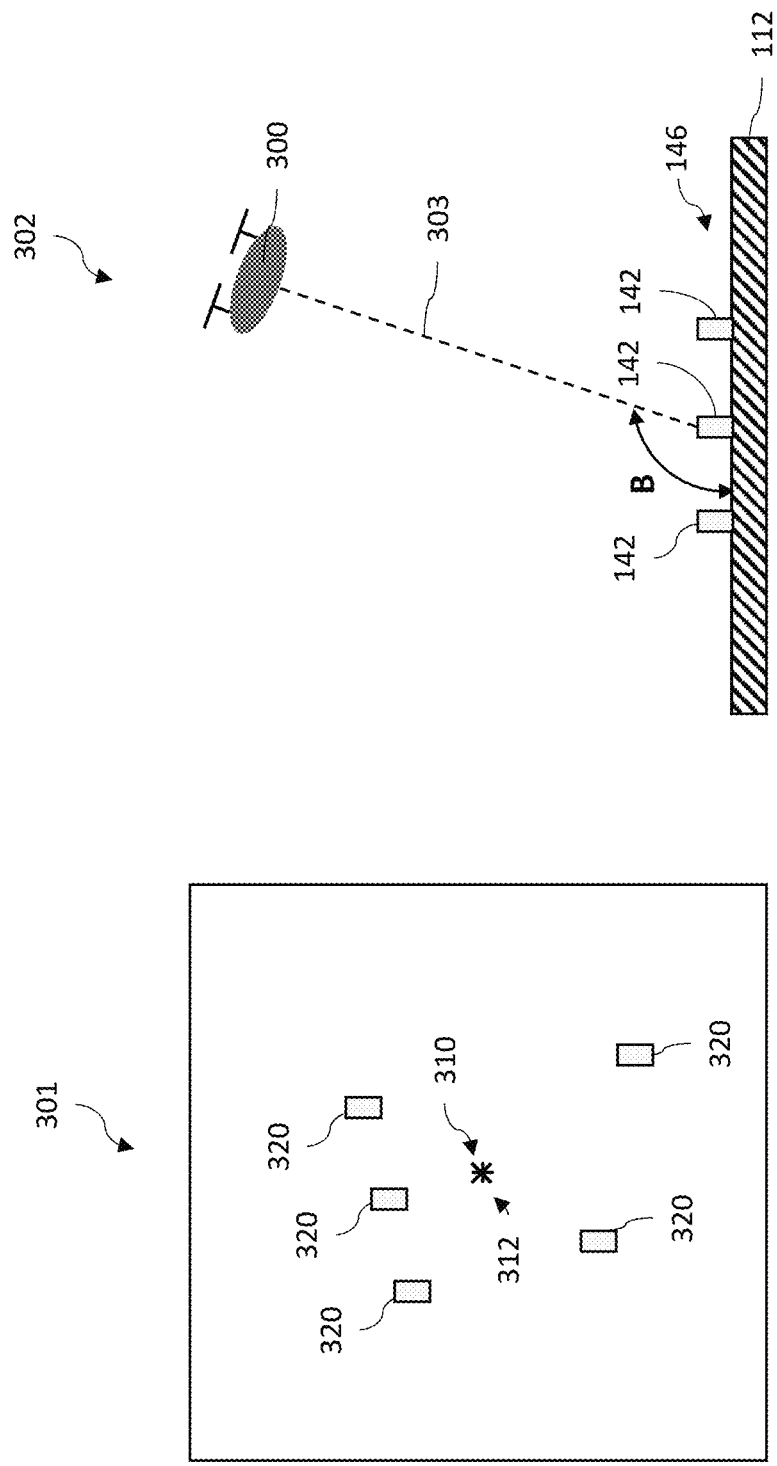

In FIG. 3H, the vehicle 300 has change position so that it is no longer positioned directly over the retroreflector array 146 pattern. In this example, the vehicle 300 has rolled to the right and the aircraft is east of the landing site. The roll happens to be such that the fiducial mark 312 at the image frame 301 center is aligned with the center point 310 of the retroreflector array 146 from which the reflection processing system 123 can determine that the image capturing device 126 is looking straight at the center of the landing pad 112. The LOS angle with respect to the ground (shown as angle B) can be determined from the corner angles as they appear in the pattern 315 of the reflected light pulse images 320 (which will be trapezoidal) and/or the ratio of the parallel side lengths of the trapezoid image.

Figure 3I:
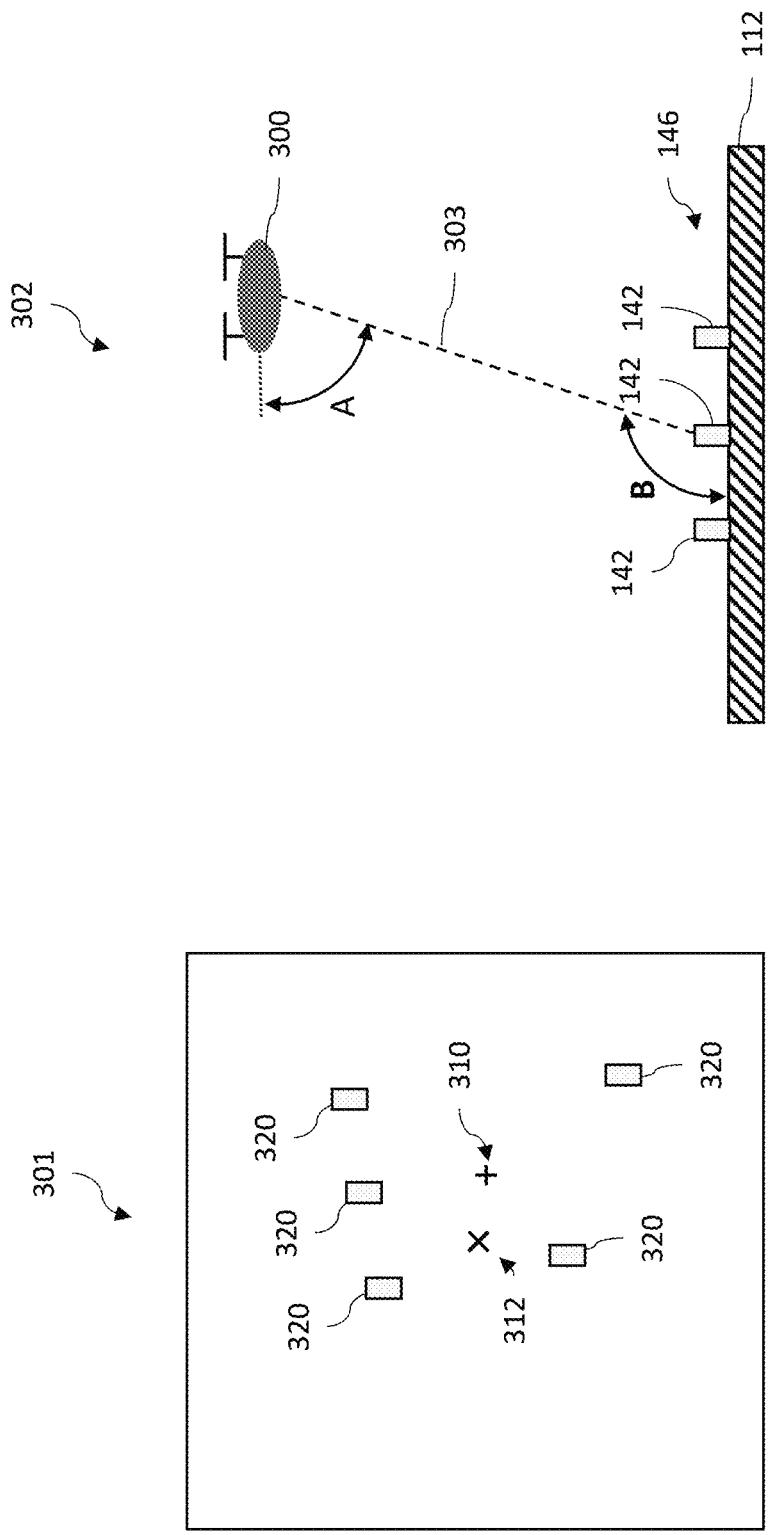
Figure 3J:
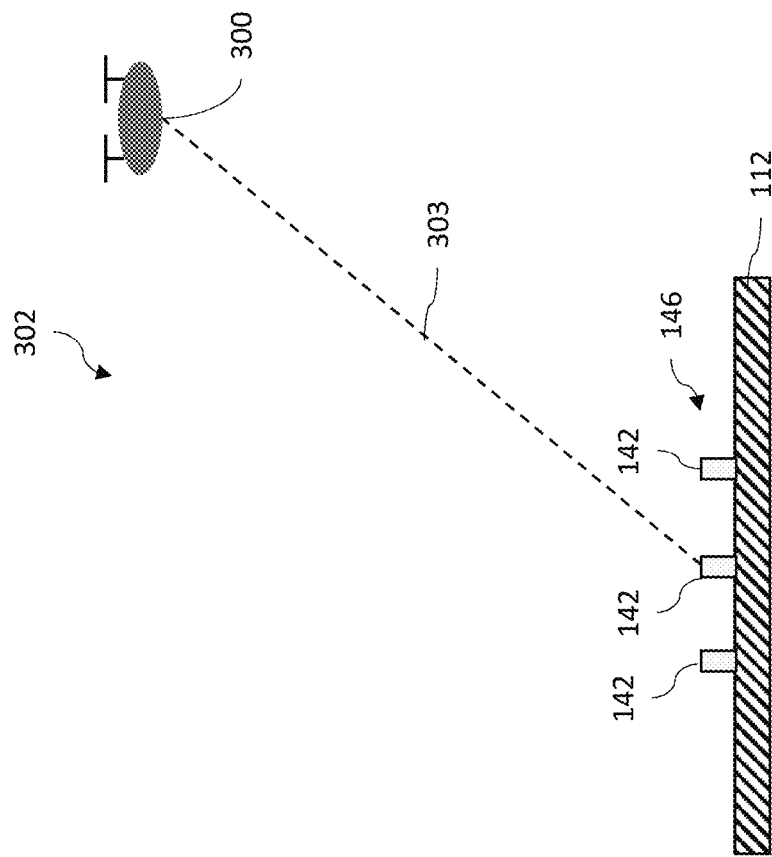
Figure 3J:
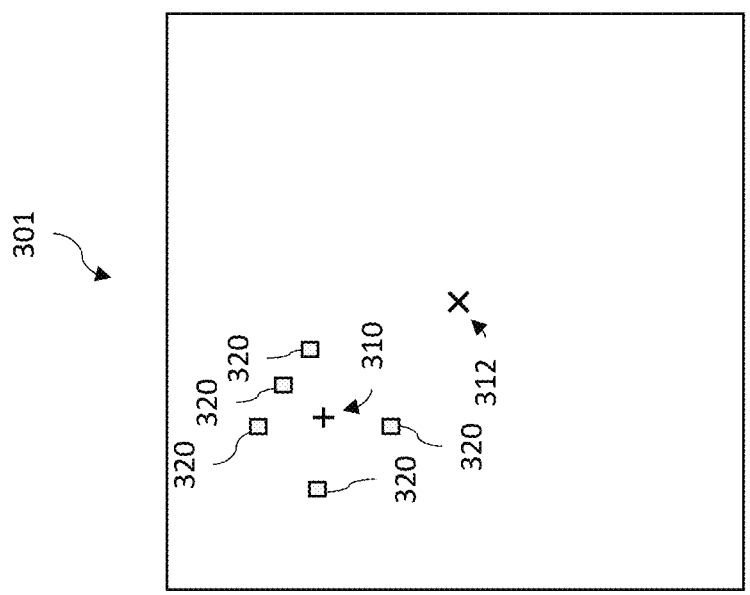

FIG. 3I is the same scenario as in FIG. 3H, except that the vehicle 300 is traveling level. As a result, the image capturing device 126 is no longer looking straight at the center of the landing pad 112. Here, the vehicle roll angle "A" can be determined in the manner described for FIG. 3B, and the LOS angle "B" determined as described for FIG. 3H. It should be noted that is the vehicle 300 is flying level, the roll angle "A" will be the complement of the LOS angle "B". It should also be noted that there can also be a pitch angle C calculated by the reflection processing system, which is to pitch as angle B is to roll and calculated as described with respect to FIG. 3C. As a function of these angles, the reflection processing system 123 calculates one or more of the LOS distances to the landing pad 112 and the landing pad 112 location with respect to the vehicle 120. The position the vehicle 120 with respect to the Earth (such as a latitude and longitude, for example) may then be calculated reflection processing system 123, providing a navigation solution to the vehicle navigation system 124. In some embodiments where the landing pad 112 is off level, slope information may be obtained along with the baseline pattern information (for example from a database or other source) and utilized in the angle calculations.

In some embodiments, the strobe light generator system 121 and the reflected strobe image capturing system 122 may operate independently from each other. That is, the one or more strobe light emitters 125 flash at a rate that is not intentionally synchronized with the frame rate of images captured by the image capturing device(s) 126. In that case, the reflected strobe image capturing system 122 may operate to continuously capture and produce image frames for the reflection processing system 123, and the reflection processing system 123 may discard those image frames not comprising reflected light pulse images 320, and utilize those that do. In other embodiments, the reflection processing system 123 may synchronize the capturing of image frames and the flashing of the strobe light emitters 125. For example, in one embodiment, the reflection processing system 123 may comprise a strobe controller 226 that performs this synchronization, wherein either the strobe light generator system 121 is synchronized to the reflected strobe image capturing system 122, or the reflected strobe image capturing system 122 is synchronized to the strobe light generator system 121.

In some embodiments, the strobe controller 226 may inform the reflection processing system 123 of the times when the strobe light emitters 125 are activate, so that it only pulls image frames for processing that correlate to those times. In other embodiments, the strobe controller 226 can send control signals to the strobe light generator system 121 to set the characteristics of the light pulses generated by strobe light emitters 125 such as the intensity of the light pulses, the duration of the light pulses, and/or the flash rate (i.e., the frequency of occurrence) of light pulses. The strobe controller 226 may also send control signals to the reflected strobe image capturing system 122 to coordinate the frame rate and effective shutter speed of the image capturing device(s) 126 with the occurrence of light pulses generated by strobe light emitters 125. As such, the strobe controller 226 can set the operation of the image capturing device(s) 126 based on when strobe pulses are generated, or conversely set the generation of strobe pulses to occur based on the timing of when the image capturing device(s) 126 are set to capture images. In each of these options, processing resources may be conserved by not having to process image frames having no usable information from reflected light pulse images 320.

The examples above have been described with respect to a single vehicle 120 approaching a designated landing pad 112. However, as mentioned above with respect to FIG. 1, a vertiport 110 may comprise a multitude of landing pad 112 where multiple vehicles 120 may be operating. It can therefore be expected under such conditions that the retroreflector array 146 at a landing pad 112 may become illuminated by light pulses 130 originating from other vehicles, or that reflected strobe light pulses 132 returning to other vehicles may be observed. In other instances, one or more retroreflectors 142 of a retroreflector array 146 may become illuminated by stray light from other sources. When these unintended returns are received by the image capturing device(s) 126 of vehicle 120, there is a potential that they may result in false reflected light pulse images 320 appearing in the image frames 301 processed by the reflection processing system 123 and thus contaminating the information that reflection processing system 123 uses to determine the angles, distances, headings and navigation solution as discussed above.

To address this issue, in some embodiments, the strobe light generator system 121 may control a modulation of the light pulses 130 generated by the strobe light emitters 125 with a digital signature that is recognizable by the reflection processing system 123 so that the reflection processing system 123 only processes images of reflected strobe light pulses 132 encoded with that pattern. A digital signature can not only address the issue of accidental crosstalk among multiple vehicles in a congested area, but also guard against malicious spoofing.

Figure 4:
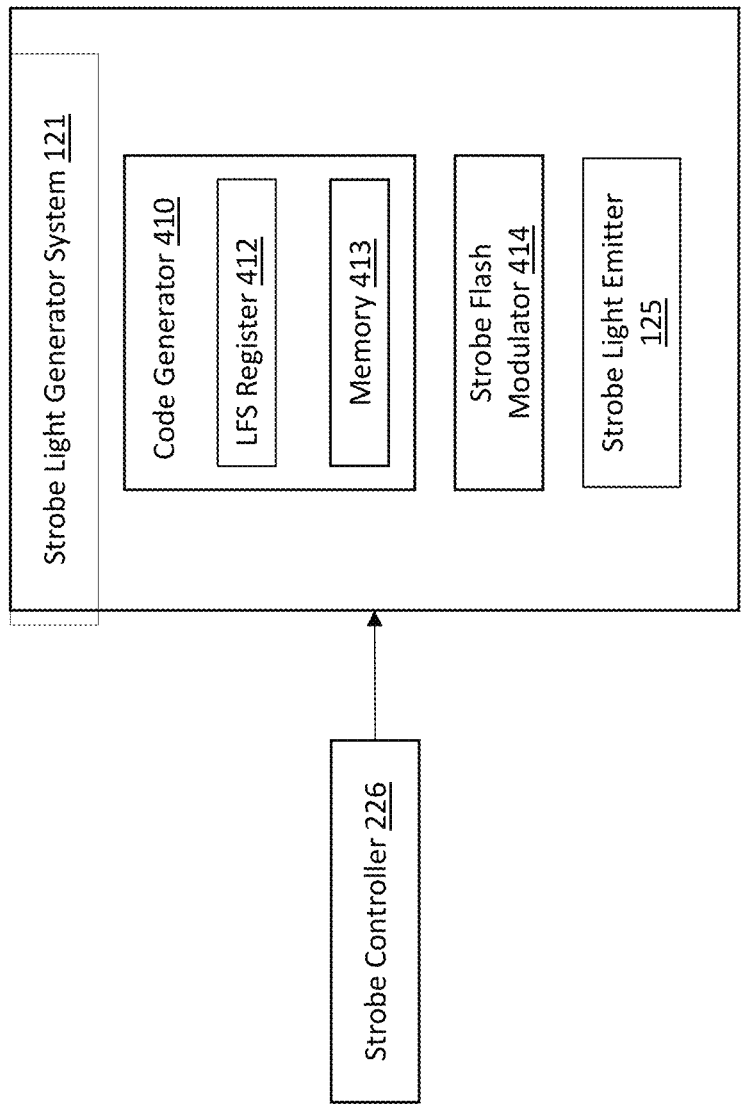
FIG. 4 is a diagram illustrating an example embodiment of a strobe light generator system.

FIG. 4 is an example embodiment where the strobe light generator system 121 is configured to modulate a digital signature onto the light pulses 130 that is recognizable by the reflection processing system 123. In this embodiment, the strobe light generator system 121 comprises a code generator 410 coupled to a strobe flash modulator 414. The strobe flash modulator 414 modulates the light pulse 130 generated by the strobe light emitter(s) 125 in response to a signal provided by the code generator 410. In one embodiment, the strobe controller 226 sets the code generator 410 to use a pseudo-noise (PN) sequence recognizable by the reflection processing system 123. In some embodiments, the selected digital signature is one permanently assigned to the vehicle 120. In other embodiments, the reflection processing system 123 may be assigned the digital signature at the time of its departure. It may also be stored into the memory 212 of the reflection processing system 123 and, and programed into a memory 413 of the code generator 410 (for example, by the strobe controller 226). In other embodiments, the digital signature may be obtained in conjunction with receiving a clearance to land at a designated arrival landing pad 112. In these ways, both the strobe light generator system 121 and reflection processing system 123 will have knowledge of the digital signature so that the reflection processing system 123 can recognize reflected strobe light pulses 132 resulting from light pulses 130 generated by its own strobe light emitter(s) 125. In still other embodiments, the reflection processing system 123 can self-assign a digital signature, and/or auto-negotiate with other vehicles to established a self-assigned digital signature that is distinct from those used by other vehicles in its proximity.

In some embodiments, the code generator 410 comprises a linear feedback shift register 412 for generating a PN sequence that is modulated onto the light pulses 130. An advantageous characteristic of PN sequences is that they are detectable even with negative signal-to-noise ratios. As an example, the linear feedback shift register 412 may comprise a 9 flip-flop register that can produce PN sequences having 511 chips before the sequence repeats. For a 9 flip-flop register, there are approximately 57 unique repeating sequence patterns that can be generated and used for modulating the light pulses 130. This number of possible repeating sequence patterns may be sufficient where the vehicle 120 will only ever be in the proximity of a small number of other vehicles. In other embodiments, the linear feedback shift register 412 having a greater or few number of flip-flops. For example, with 31 flip-flops the linear feedback shift register 412 could produce about 69 million unique sequences of 2,147,483,647 chips. This number of possible repeating sequence patterns is likely sufficient to be able to provide a unique digital signature to each vehicle manufactured. The tradeoff is that the more sequences available, the longer it takes the flashing of a strobe light emitter 125 to transmit the sequence and for the reflection processing system to separate one sequence from other patterns.

Figure 5:
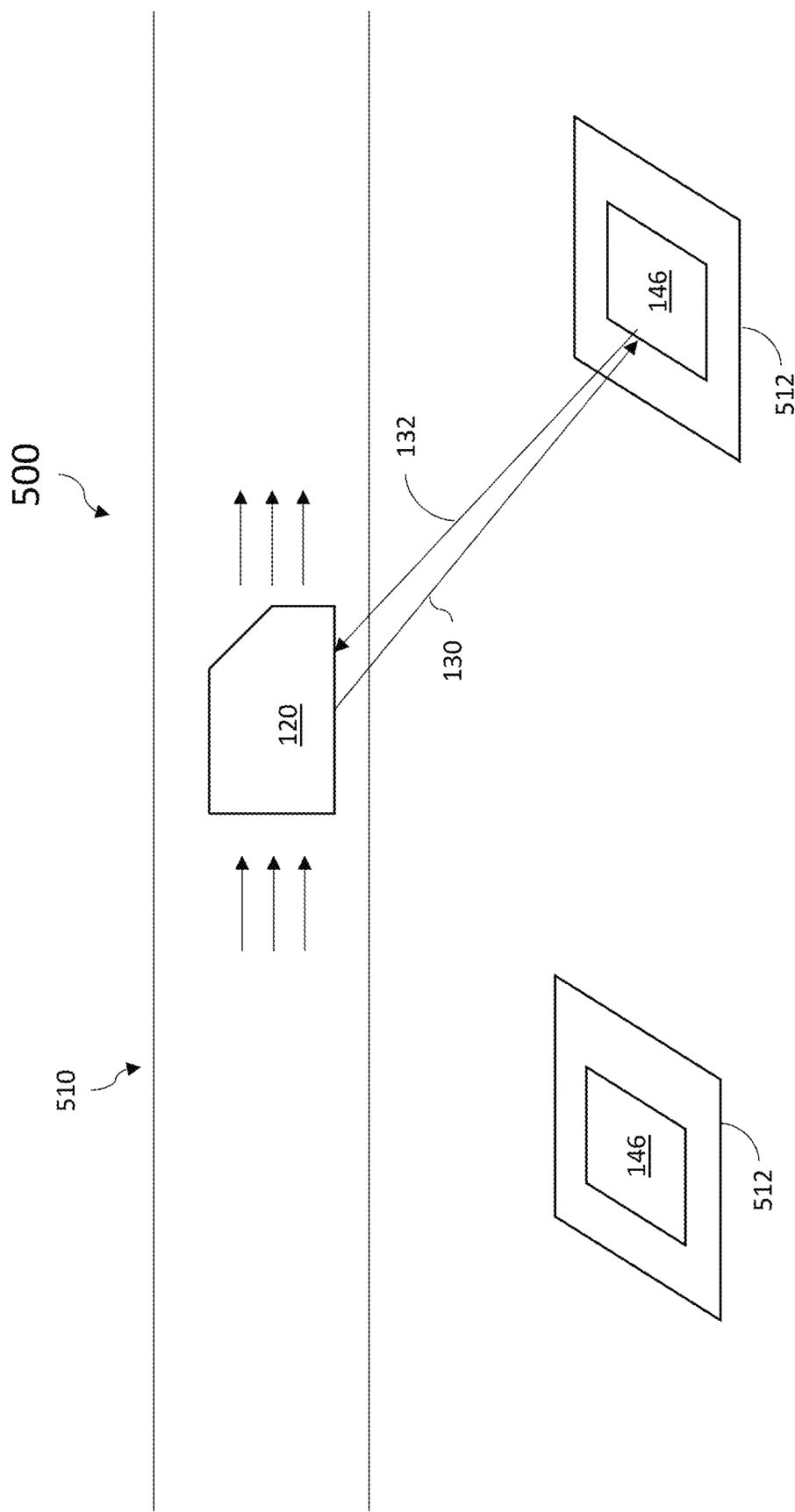
FIG. 5 is a diagram illustrating a reflected strobe light vehicle navigation system of one example embodiment.

In one or more of the various embodiments discussed above, the disclosed retroreflector array 146 is utilized in conjunction with a landing pad 112 for the purpose of aiding the vehicle 120 in navigating to the landing pad 112 for the purpose of landing. As illustrated in FIG. 5 generally at 500, in an alternate embodiment, a series of retroreflector arrays 146 placed along a travel corridor 510 may be used to effectuate navigation pattern structures 512 which the vehicle 120 utilizes as navigation aids. That is, the strobe light emitter 125 transmits a light pulse 130 to the navigation pattern structure 512 where it is received by a retroreflector array 146 producing a return comprising a pattern of reflected strobe light pulses 132 that are received by the reflected strobe image capturing system 122. The reflection processing system 123 then analyzing a resulting image frame precisely the same manner as described above for a landing pad 112 to determine the angles, distances, headings and/or navigation solution as discussed above. However, in this case the angles, distances, headings and/or navigation solution calculated by the reflection processing system 123 is utilized by the vehicle navigation system 124 for other navigation purposes such as, but not limited to, maintaining the vehicle 120 direction of travel within the boundaries of the travel corridor 510, determining the vehicle 120's position within the context of the travel corridor 510 (where the navigation pattern structures 512 may serve the same purpose as mile or kilometer markers along a highway), marking the equivalent of on-ramps or off-ramps from the travel corridor 510, determining its absolute position with respect to the Earth, or serving as waypoints for other purposes. For example, the reflection processing system 123 may periodically utilize the geo-alignment retroreflector 142 of a retroreflector array 146 to correct its heading.

EXAMPLE EMBODIMENTS

Example 1 includes a reflected strobe light navigation system for a vehicle, the system comprising: a vehicle navigation system; a reflection processing system coupled to the vehicle navigation system, wherein the reflection processing system is configured to output a navigation solution to the vehicle navigation system; a strobe light generator system configured to transmit a light pulse from the vehicle; and a reflected strobe image capturing system coupled to the reflection processing system, wherein the reflected strobe image capturing system is configured to capture images of reflected strobe light pulses received from a retro-reflector array, wherein the reflected strobe light pulses comprise reflections of the light pulse reflected by the retro-reflector array; wherein the reflection processing system evaluates one or more image frames each comprising a pattern of reflected light pulse images produced from the reflected strobe light pulses to calculate the navigation solution.

Example 2 includes the system of Example 1, wherein the strobe light generator system comprises one or more dual use strobe lights also utilized for vehicle clearance strobe lights or collision avoidance strobe lights.

Example 3 includes the system of any of Examples 1-2, wherein the reflected strobe image capturing system comprises a plurality of image capturing devices, wherein the one or more image frames evaluated by the reflection processing system each comprise a composite image produced from a plurality of images of the reflected strobe light pulses captured by the plurality of image capturing devices.

Example 4 includes the system of any of Example 1-4, wherein the retro-reflector array indicates a location of a landing pad for the vehicle.

Example 5 includes the system of Example 4, wherein the retro-reflector array comprises a plurality of retroreflectors arranged in a geometric pattern; wherein the reflection processing system is configured to compare the geometric pattern of the plurality of retroreflectors against baseline pattern information to differentiate the landing pad from other landing pads utilizing the pattern of reflected light pulse images appearing in the one or more image frames.

Example 6 includes the system of Example 5, wherein the plurality of retroreflectors filter the light pulse to impart a color on the reflected strobe light pulses; wherein the reflection processing system is configured to further differentiate the landing pad from other landing pads based on a color pattern of the reflected light pulse images appearing in the one or more image frames.

Example 7 includes the system of any of Examples 5-6, wherein the reflection processing system stores the baseline pattern information in a memory.

Example 8 includes the system of any of Examples 1-7, wherein the reflection processing system calculates the navigation solution by evaluating a pattern mapping of the retro-reflector array as appearing in the one or more image frames.

Example 9 includes system of Examples 1-8, wherein the reflection processing system calculates the navigation solution by evaluating offsets, a rotation, or a combination of offsets and rotation, in a position of the reflected light pulse images appearing in the one or more image frames.

Example 10 includes the system of Example 1-9, wherein the reflection processing system calculates a heading of the vehicle based on an irregularity of a polygon shape of the retro-reflector array.

Example 11 includes the system of Example 10, wherein the retro-reflector array comprises a geo-alignment retroreflector, wherein the reflection processing system calculates a heading of the vehicle based on a position of the geo-alignment retroreflector with respect to a center of the retro-reflector array.

Example 12 includes the system of any of Example 1-11, wherein the reflection processing system calculates one or more of a line-of-sight angle, a vehicle pitch, a vehicle roll, a vehicle speed, or a distance, from the pattern of reflected light pulse images.

Example 13 includes the system of any of Example 1-12, wherein the strobe light generator system comprises a strobe flash modulator, wherein the strobe flash modulator modulates a digital signature onto the light pulse that is recognizable by the reflection processing system; wherein the reflection processing system is configured to processes images of the reflected strobe light pulses based on the reflected strobe light pulses having the digital signature.

Example 14 includes the system of Example 13, wherein the strobe light generator system comprises a code generator coupled to the strobe flash modulator, wherein the strobe flash modulator modulates a digital signature onto the light pulse in response to the code generator.

Example 15 includes the system of any of Example 1-14, wherein the strobe light generator system and the reflected strobe image capturing system are synchronized; wherein either the strobe light generator system is synchronized to the reflected strobe image capturing system, or the reflected strobe image capturing system is synchronized to the strobe light generator system.

Example 16 includes the system of any of Example 1-15, wherein the retro-reflector array indicates a location of a navigation pattern structure; wherein the vehicle navigation system navigates the vehicle through a travel corridor based on the navigation solution.

Example 17 includes a method for strobe light navigation for a vehicle, the method comprising: transmitting a light pulse from a vehicle with a strobe light generator system; capturing images of reflected strobe light pulses received from a retro-reflector array, wherein the reflected strobe light pulses comprise reflections of the light pulse reflected by the a retro-reflector array; evaluating one or more image frames each comprising a pattern of reflected light pulse images produced from the reflected strobe light pulses to calculate a navigation solution; and outputting the navigation solution to a vehicle navigation system.

Example 18 includes the method of Example 17, wherein the retro-reflector array indicates a location of a landing pad for the vehicle, and wherein the retro-reflector array comprises a plurality of retroreflectors arranged in a geometric pattern, the method further comprising: comparing the geometric pattern of the plurality of retroreflectors against baseline pattern information to differentiate the landing pad from other landing pads utilizing the pattern of reflected light pulse images appearing in the one or more image frames.

Example 19 includes the method of any of Examples 17-18, further comprising: evaluating offsets, a rotation, or a combination of offsets and rotation, in a position of the reflected light pulse images appearing in the one or more image frames to calculate the navigation solution.

Example 20 includes the method of any of Examples 17-19, wherein the retro-reflector array comprises a geo-alignment retroreflector, wherein the method further comprises: calculating a heading of the vehicle based on a position of the geo-alignment retroreflector with respect to a center of the retro-reflector array.

In various alternative embodiments, system and/or device elements, method steps, or example implementations described throughout this disclosure (such as any of the Reflected Strobe Image Capturing System, strobe light generator system, reflection processing system, vehicle navigation system, strobe controller, image processing function, image stitching function, code generator, strobe modulator, other on-vehicle devices, or any controllers, processors, circuits, or sub-parts thereof, for example) may be implemented at least in part using one or more computer systems, field programmable gate arrays (FPGAs), or similar devices comprising a processor coupled to a memory and executing code to realize those elements, processes, or examples, said code stored on a non-transient hardware data storage device. Therefore, other embodiments of the present disclosure may include elements comprising program instructions resident on computer readable media which when implemented by such computer systems, enable them to implement the embodiments described herein. As used herein, the term "computer readable media" refers to tangible memory storage devices having non-transient physical forms. Such non-transient physical forms may include computer memory devices, such as but not limited to punch cards, magnetic disk or tape, any optical data storage system, flash read only memory (ROM), non-volatile ROM, programmable ROM (PROM), erasable-programmable ROM (E-PROM), random access memory (RAM), or any other form of permanent, semi-permanent, or temporary memory storage system or device having a physical, tangible form. Program instructions include, but are not limited to computer-executable instructions executed by computer system processors and hardware description languages such as Very High Speed Integrated Circuit (VHSIC) Hardware Description Language (VHDL).

As used herein, terms such as "reflected strobe image capturing system", "strobe light generator system", "reflection processing system", "vehicle navigation system", "strobe controller", "image processing function", "image stitching function", "code generator", "strobe modulator" refer to the names of elements that would be understood by those of skill in the art of avionics and other transportation industries and are not used herein as nonce words or nonce terms for the purpose of invoking 35 USC 112(f).

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the presented embodiments. Therefore, it is manifestly intended that embodiments be limited only by the claims and the equivalents thereof.

What is claimed is:

1. A reflected strobe light navigation system for a vehicle, the system comprising:
   a vehicle navigation system;
   a reflection processing system coupled to the vehicle navigation system, wherein the reflection processing system is configured to output a navigation solution to the vehicle navigation system;
   a strobe light generator system configured to transmit a light pulse from the vehicle; and
   a reflected strobe image capturing system coupled to the reflection processing system, wherein the reflected strobe image capturing system is configured to capture images of reflected strobe light pulses received from a retro-reflector array, wherein the reflected strobe light pulses comprise reflections of the light pulse reflected by the retro-reflector array;
   wherein the retro-reflector array indicates a location of a landing pad for the vehicle and wherein the retro-reflector array comprises a plurality of retroreflectors arranged in a geometric pattern;

wherein the reflection processing system is configured to compare the geometric pattern of the plurality of retroreflectors against baseline pattern information to differentiate the landing pad from other landing pads utilizing the pattern of reflected light pulse images appearing in the one or more image frames;

wherein the reflection processing system evaluates one or more image frames each comprising a pattern of reflected light pulse images produced from the reflected strobe light pulses to calculate the navigation solution.

2. The system of claim 1, wherein the strobe light generator system comprises one or more dual use strobe lights also utilized for vehicle clearance strobe lights or collision avoidance strobe lights.

3. The system of claim 1, wherein the reflected strobe image capturing system comprises a plurality of image capturing devices, wherein the one or more image frames evaluated by the reflection processing system each comprise a composite image produced from a plurality of images of the reflected strobe light pulses captured by the plurality of image capturing devices.

4. The system of claim 1, wherein the baseline pattern information comprises a database having a catalog of landing pads and the baseline pattern associated with each landing pad.

5. The system of claim 4, wherein the reflection processing system downloads the baseline pattern information for the landing pad at the time of departure or when cleared to land.

6. The system of claim 1, wherein the plurality of retroreflectors filter the light pulse to impart a color on the reflected strobe light pulses;
wherein the reflection processing system is configured to further differentiate the landing pad from other landing pads based on a color pattern of the reflected light pulse images appearing in the one or more image frames.

7. The system of claim 1, wherein the reflection processing system stores the baseline pattern information in a memory.

8. The system of claim 1, wherein the reflection processing system calculates the navigation solution by evaluating a pattern mapping of the retro-reflector array as appearing in the one or more image frames.

9. A reflected strobe light navigation system for a vehicle, the system comprising:
a vehicle navigation system;
a reflection processing system coupled to the vehicle navigation system, wherein the reflection processing system is configured to output a navigation solution to the vehicle navigation system;
a strobe light generator system configured to transmit a light pulse from the vehicle; and
a reflected strobe image capturing system coupled to the reflection processing system, wherein the reflected strobe image capturing system is configured to capture images of reflected strobe light pulses received from a retro-reflector array, wherein the reflected strobe light pulses comprise reflections of the light pulse reflected by the retro-reflector array;
wherein the reflection processing system evaluates one or more image frames each comprising a pattern of reflected light pulse images produced from the reflected strobe light pulses to calculate the navigation solution;
wherein the reflection processing system calculates the navigation solution by evaluating offsets, a rotation, or a combination of offsets and rotation, in a position of the reflected light pulse images appearing in the one or more image frames.

10. The system of claim 9, wherein the reflection processing system calculates a heading of the vehicle based on an irregularity of a polygon shape of the retro-reflector array.

11. The system of claim 10, wherein the retro-reflector array comprises a geo-alignment retroreflector, wherein the reflection processing system calculates a heading of the vehicle based on a position of the geo-alignment retroreflector with respect to a center of the retro-reflector array.

12. The system of claim 1, wherein the reflection processing system calculates one or more of a line-of-sight angle, a vehicle pitch, a vehicle roll, a vehicle speed, or a distance, from the pattern of reflected light pulse images.

13. The system of claim 1, wherein the strobe light generator system comprises a strobe flash modulator, wherein the strobe flash modulator modulates a digital signature onto the light pulse that is recognizable by the reflection processing system;
wherein the reflection processing system is configured to processes images of the reflected strobe light pulses based on the reflected strobe light pulses having the digital signature.

14. The system of claim 13, wherein the strobe light generator system comprises a code generator coupled to the strobe flash modulator, wherein the strobe flash modulator modulates a digital signature onto the light pulse in response to the code generator.

15. The system of claim 1, wherein the strobe light generator system and the reflected strobe image capturing system are synchronized;
wherein either the strobe light generator system is synchronized to the reflected strobe image capturing system, or the reflected strobe image capturing system is synchronized to the strobe light generator system.

16. The system of claim 9, wherein the retro-reflector array indicates a location of a navigation pattern structure;
wherein the vehicle navigation system navigates the vehicle through a travel corridor based on the navigation solution.

17. A method for strobe light navigation for a vehicle, the method comprising:
transmitting a light pulse from a vehicle with a strobe light generator system, wherein the strobe light generator system comprises a strobe flash modulator, wherein the strobe flash modulator modulates a digital signature onto the light pulse;
capturing images of reflected strobe light pulses received from a retro-reflector array with a reflection processing system, wherein the reflected strobe light pulses comprise reflections of the light pulse reflected by the a retro-reflector array, wherein the digital signature is recognizable by the reflection processing system and wherein the reflection processing system is configured to processes images of the reflected strobe light pulses based on the reflected strobe light pulses having the digital signature;
evaluating one or more image frames each comprising a pattern of reflected light pulse images produced from the reflected strobe light pulses to calculate a navigation solution; and
outputting the navigation solution to a vehicle navigation system.

18. The method of claim 17, wherein the retro-reflector array indicates a location of a landing pad for the vehicle, and wherein the retro-reflector array comprises a plurality of retroreflectors arranged in a geometric pattern, the method further comprising:

comparing the geometric pattern of the plurality of retroreflectors against baseline pattern information to differentiate the landing pad from other landing pads utilizing the pattern of reflected light pulse images appearing in the one or more image frames.

19. The method of claim 17, further comprising:

evaluating offsets, a rotation, or a combination of offsets and rotation, in a position of the reflected light pulse images appearing in the one or more image frames to calculate the navigation solution.

20. The method of claim 17, wherein the retro-reflector array comprises a geo-alignment retroreflector, wherein the method further comprises:

calculating a heading of the vehicle based on a position of the geo-alignment retroreflector with respect to a center of the retro-reflector array.

* * * * *